US007486206B2

(12) United States Patent
Kahlman

(10) Patent No.: US 7,486,206 B2
(45) Date of Patent: Feb. 3, 2009

(54) METHOD FOR CROSSTALK REDUCTION BETWEEN TRACKS ON A RECORDING MEDIUM, RECORDING DEVICE, PLAYBACK DEVICE AND RECORDING MEDIUM

(75) Inventor: Josephus Arnoldus Henricus Maria Kahlman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 617 days.

(21) Appl. No.: 10/540,675

(22) PCT Filed: Dec. 1, 2003

(86) PCT No.: PCT/IB03/05833

§ 371 (c)(1),
(2), (4) Date: Jun. 24, 2005

(87) PCT Pub. No.: WO2004/059646

PCT Pub. Date: Jul. 15, 2004

(65) Prior Publication Data

US 2006/0072418 A1    Apr. 6, 2006

(30) Foreign Application Priority Data

Dec. 30, 2002   (EP)  .................................. 02080584

(51) Int. Cl.
*H03M 7/00* (2006.01)
(52) U.S. Cl. ........................................... 341/51; 341/58
(58) Field of Classification Search .................. 341/50, 341/51, 58, 94; 369/53.34, 275.3, 275.4
See application file for complete search history.

(56) References Cited

U.S. PATENT DOCUMENTS

| 5,153,866 | A  | * | 10/1992 | Satoh et al. ............... 369/53.24 |
| 6,181,658 | B1 | * | 1/2001  | Van Den Enden et al. ....................... 369/59.25 |
| 6,970,406 | B2 | * | 11/2005 | Kuribayashi et al. ..... 369/47.19 |
| 6,982,937 | B2 | * | 1/2006  | Kanaoka et al. .......... 369/47.17 |

* cited by examiner

Primary Examiner—Brian Young

(57) ABSTRACT

In order to reduce the cross talk between data recorded in adjacent tracks on a record carrier the encoding of the data stream into code words is controlled using control points. The code words in a first track are altered by selecting that value of the control point that results in code words that differ in as many bit positions as possible from the corresponding bit positions in a second track, where the first track and second track are both adjacent to the same third track. Having opposite bit values in corresponding bit positions on the first and second track results in the lowest contribution of these bit positions to the code words stored in the third track.

13 Claims, 7 Drawing Sheets

METHOD FOR CROSSTALK REDUCTION BETWEEN TRACKS ON A RECORDING MEDIUM, RECORDING DEVICE, PLAYBACK DEVICE AND RECORDING MEDIUM

This invention relates to a method for encoding a stream of input words into a stream of code words using a channel code for storage of the stream of code words on a recording medium comprising tracks for storage of the stream code words comprising the steps of:

encoding the stream of input words into the stream of code words, to a recording device for recoding data on a record carrier, to a record carrier, to a playback device and to an encoder.

In order to keep the crosstalk between neighboring tracks on a record carrier at an acceptable level the tracks are positioned relatively far apart. The further apart the lower the crosstalk so the crosstalk defines a minimum distance between the track, the minimum track pitch. The problem associated with this minimum track pitch is that it results in a maximum recording density (bits per square centimeter) which imposes a maximum recording capacity on a record carrier with a given physical size.

It is an objective of this invention to overcome this problem by providing a method which reduces the minimum track pitch without increasing the cross talk between neighboring tracks.

In order to achieve this objective the method is characterized in that the method comprises the following steps determining a control point in the data stream of input words or the stream of code words where the data stream of input words or the stream of code words can be altered by an alteration.

for each alteration of a group of N possible alterations determining, between a group of code words in a first track and a group of code words in a second track which is adjacent to a third track which is adjacent to the first track, a crosstalk value representing the cross talk affecting the third track corresponding to the alteration.

Selecting an optimum alteration, where the optimum alteration is that alteration from the group of N alterations which has a lowest cross talk value, Altering the data stream using the optimum alteration.

A control point is a point in the data stream where the subsequent part of the data stream can be influenced. By calculating for each of the options at the control point the resulting subsequent part of the data stream and selecting that option at the control point that results in the lowest crosstalk at a given point on the record carrier the cross talk can be lowered. This lower crosstalk can than be traded in, in the regular fashion, for a reduced track pitch. Thus by applying the method according to the invention the improvement in crosstalk and resulting improvement in signal to noise ratio allows other parameters affecting the signal to noise ratio to be chosen such that the improved signal to noise ratio is worsened again to the minimum acceptable level. Not only track pitch can be reduced when the method according to the invention is applied but also recording systems with worse signal to noise ratios for instance as a result of recording media with a reduced signal to noise ratio.

It is of course also possible to use the method to increase the signal to noise ratio to obtain a lower bit error rate during reading and writing on the storage medium by simply leaving all other parameters affecting the signal to noise ratio unchanged.

An embodiment of the method is characterized in that in that N=2. By limiting N to 2 a single bit or a choice of only 2 options suffices to control the crosstalk. This simplifies the calculations to be performed by the recording device and the playback device.

An embodiment of the method is characterized in that the control point is a bit insertion point. By inserting a bit into the data stream at predefined places in order to allow the playback device to distinguish the inserted bit, the encoding of the subsequent data stream can be influenced. When a bit with a value of '0' is inserted at the bit insertion point a different encoded data stream will result then when a bit with a value of '1' is inserted. After calculating the encoded data stream, the bit corresponding to the calculated data stream which results in the lowest crosstalk value is inserted into the data stream at the bit insertion point and encoded. The calculation can be executed for the subsequent data stream up to the next bit insertion point so that the sections of the data stream between the bit insertion points are each individually optimized for crosstalk.

An embodiment of the method is characterized in that the control point is a code word replacement point.

Instead of a bit insertion point a code replacement word can be chosen.

Many codes have code words that can never occur when encoding data streams. Such a code word can be used to change the crosstalk. A table is created that is known to both the recording device and the playback device. When the recording device encounters a code word from the table it has the option of leaving the code word in the encoded data stream or to replace the code word with the replacement code word according to the table. By choosing the replacement code words from the set of code words that can never occur the playback device is able to distinguish the replacement code word from the other code words in the encoded data stream and replace the replacement code word with the corresponding code word of the table. The choice of replacement code word can be made dependant on the state of the coder, comparable to the method used in EFM-plus encoding and decoding. The method of altering a data stream using replacement code words is disclosed in patent application EP 02076424.7. The recording device chooses whether to replace the code word by the replacement code word depending on the calculated effect on the crosstalk. Because of the NRZI encoder used to encode the encoded data stream into NRZI format suitable for the recording medium the replacement code word can affect the subsequent NRZI encoded data stream by differing in the number of '1' bits by an odd number compared to the code word to be replaced. Changing the number of '1' bits from even to odd or from odd to even means that all subsequently NRZI encoded bits coming out of the NRZI coder will change polarity because a '1' going into the NRZI coder means a change in level at the output of the NRZI coder.

A further embodiment of the method is characterized in that a crosstalk value is determined calculating a running digital sum value of an exclusive NOR operation performed bitwise on the group of code words in the first track and the group of code words in the second track.

The crosstalk between tracks is lowest when the bits in the first track have the opposite polarity of the bits in the second track. Since the perfect situation cannot be obtained because in that case the contents of one track would dictate that the contents of the second track must be the precise inverse of the contents of the first track, the method determines a digital sum value to obtain an indication of the amount of bits located close to each other but on the second track which are of opposite polarity. The exclusive NOR operation determines whether bits on the first track are the opposite polarity of the bits on the second track which are located in corresponding bit positions. In this way a bit wise comparison of a group of bits in the first track to a group of bits in the second track is achieved. If the digital sum is low the polarity of the group of bits in the first track differs substantially from the polarity of the group of bits in the second track, i.e. crosstalk is low. If the digital sum is high the polarity of the group of bits in the first track resembles the polarity of the group of bits in the second track, i.e. crosstalk is high.

A further embodiment of the method is characterized in that the group of code words in the first track is limited to a section of the first track and that the group of code words in the second track is limited to a section of the second track and that the section of the first track is aligned perpendicular to a reading direction of the first track with the section of the second track.

Instead of calculating the digital sum for complete tracks the calculation can also be performed for only a section of tracks that are aligned perpendicular to the reading direction. This requires more control points to be used but this results in improved control over the crosstalk in smaller areas allowing a better optimization. It is of course imperative to have the sections of the tracks involved in the bitwise exclusive NOR operation exactly aligned, i.e. the start of the section on the first track must be aligned with the start of the corresponding section on the second track and the end of the section on the first track must be aligned with the end of the corresponding section on the second track.

The data can be stored in the tracks in several ways without affecting the effectiveness of the invention:
  Data represented by pits on an optical recording medium
  Data represented by modulation of the track position on an optical recording medium
  Data represented by magnetic regions on a optical/magnetic or magnetic recoding medium Wherever the data is represented by physical differences in the recording medium and the data is read out in a way that bits in close proximity to the bit being read can increase the read or write noise level by crosstalk the invention can be applied.

The invention can also be applied to the parallel transmission of data through transmission channels that exhibit cross talk. When the transmission is coordinated the encoding of the data can include control points where the encoding of the data on a first channel can be altered according to the invention compared to the data in a second channel, in order to reduce the noise level contribution of the first and second channel to a third channel.

The invention will now be described based on figures.

In order to distinguish more clearly between the overall encoder and the encoders that are comprised within the overall encoder, the encoders comprised in the overall encoder are called 'coder' while the overall encoder is referred to as 'encoder'.

Figure 1A:
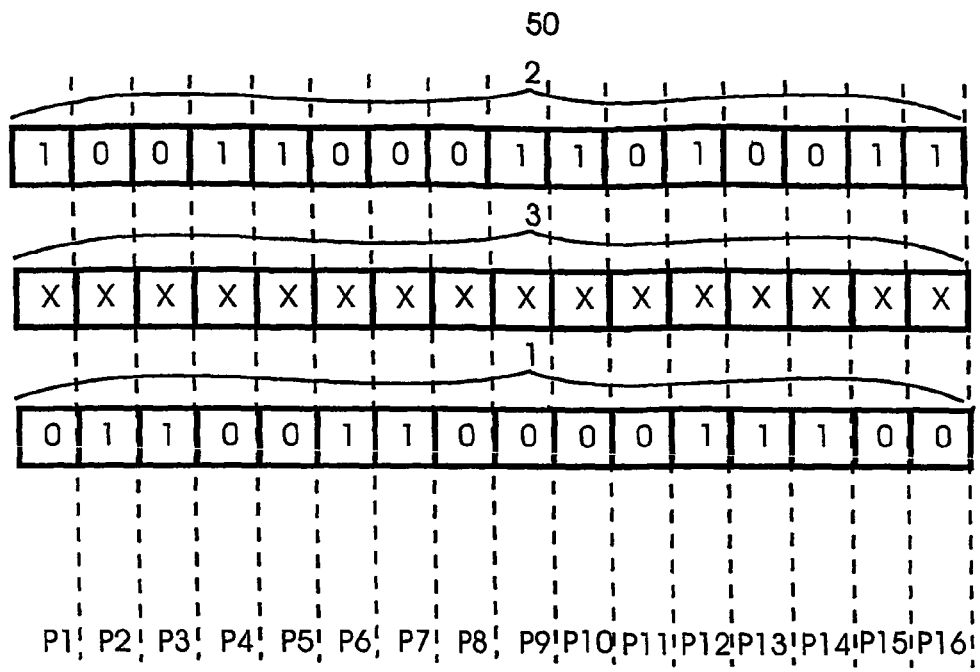
FIG. 1A shows a section of adjacent tracks

FIG. 1A shows a section of adjacent tracks. A first track 1 and a second track 2 are located adjacent to a third track 3.

In order to reduce the crosstalk in the third track 3 the bit values of the bits in the adjacent tracks 1,2 should have the opposite polarities. In the present example the bit values in the second track 2 differ from the bit values in the first track 1 in all positions except the eighth position P8, the eleventh position P11 and the twelfth position P12. It is clear that bits of the second track 2 cannot have the exact opposite bit values of the bit values of the first track 1 because otherwise no information could be recorded in the second track 2. The bit positions of the third track 3 show a bit value of 'don't care' because the actual stored value is of no importance to the invention. The measures of the invention are taken in the adjacent tracks 1,2 only. It is the bit values on the adjacent tracks 1, 2 that cause the cross talk. By balancing the crosstalk contribution of a '1' on the first track 1 by a '0' on the corresponding position on the second track 2, and of a '0' on the first track 1 by a '1' on the second track 2 the overall influence of the adjacent tracks 1, 2 on the data stored in the third track 3 is reduced.

Because the bit values of the first track 1 and the second track 2 in position P8 are both '0' the bit values are not opposite and contribute to the cross talk in the same way, thus adding to the crosstalk and increasing the noise level of the data bit in position p8 in the third track 3. The same is true for the twelfth position P12 where the bit value of both the first track 1 and the second track 2 are '1', thus not balancing each other but contributing to the crosstalk in the same way.

The data stored in the second track 2 should be in as many positions as possible the exact opposite of the data stored in the first track 1 in corresponding bit positions.

Figure 1B:
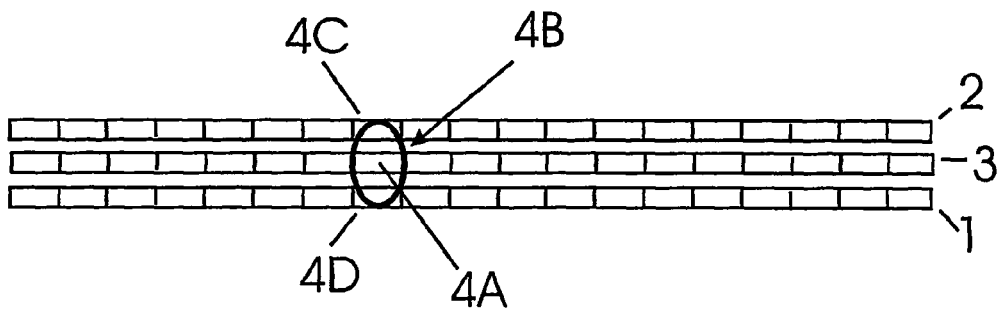
FIG. 1B illustrates the concept of crosstalk and corresponding bit positions.

FIG. 1B illustrates the concept of crosstalk and what corresponding bit positions are.

Shown are three tracks 1, 2, 3 where data is stored. The circle indicates the size of the reading spot 4B. When the track pitch is reduced the data bits 4C, 4D comprised in the third track's 3 neighboring tracks 1,2 are included in the area covered by the reading (or writing) spot 4B and thus contribute to noise level when reading the data bit 4A of the third track. These included data bits 4C, 4D are described in this document as being in corresponding bit positions on the first track 1 and on the second track 2.

The reading direction of each track is in the direction of the elongation of the track.

With the reading spot 4B as shown in FIG. 1B the data bits 4C, 4D that are included in the reading (or writing) spot are aligned perpendicular to the reading direction with the data bit 4A to be read out.

Figure 1C:
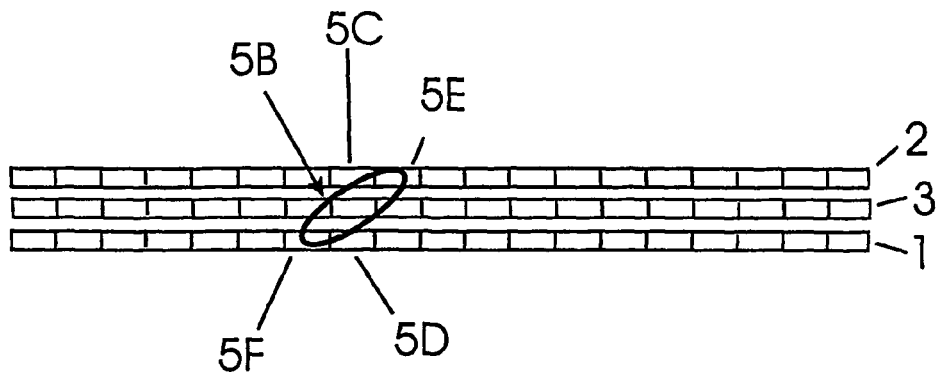
FIG. 1C illustrates the concept of crosstalk and corresponding bit positions in relation to another reading spot shape

FIG. 1C illustrates the concept of crosstalk and what corresponding bit positions are in relation to another reading spot shape.

Shown are three tracks 1, 2, 3 where data is stored. The tilted oval indicates the size of the reading spot 5B. When the track pitch is reduced the data bits 5E, 5F comprised in the third track's 3 neighboring tracks 1,2 are included in the area covered by the reading (or writing) spot 5B and thus contribute to noise level when reading the data bit 5A of the third track. It is clear that depending on the shape of the read-out or write spot the data bits on the neighboring tracks that affect the crosstalk can have different positions relative to the data bit to be read-out or written. Even though the data bits 5E, 5F which contribute to the noise level of the data bit to be read-out are no longer perpendicular aligned with the data bit to be read out the contributing data bits 5E, 5F are still considered to be at corresponding bit positions on the first track 1 and the second track 2. The data bits 5C, 5D that would be contributing to the noise level if the read-out spot 5B would be circular are in the case of the elongated oval shape of FIG. 1C no longer contributing to the noise level and are hence no longer considered to be on corresponding bit positions.

FIG. 1C also illustrates that due to the shape of the read-out spot of the write spot multiple bits in the first track 1 and second track 2 can be comprised in the spot and each bit can be comprised in the spot between 0 and 100%. Consequently it is advantageous to apply not only the crosstalk determination to the bits in the first track 1 and the second track 2 that are comprised in the spot to the highest percentage, but also bits directly adjacent to these bits. In order to reflect their lower contribution to the crosstalk a weighing function is applied. The weighing function can reflect the physical distance between the bits causing the crosstalk and the affected bit since crosstalk is a direct function of distance. The weighing can also be based on the physical shape of the read-out spot, the write spot or the shape of the pits.

Figure 2:
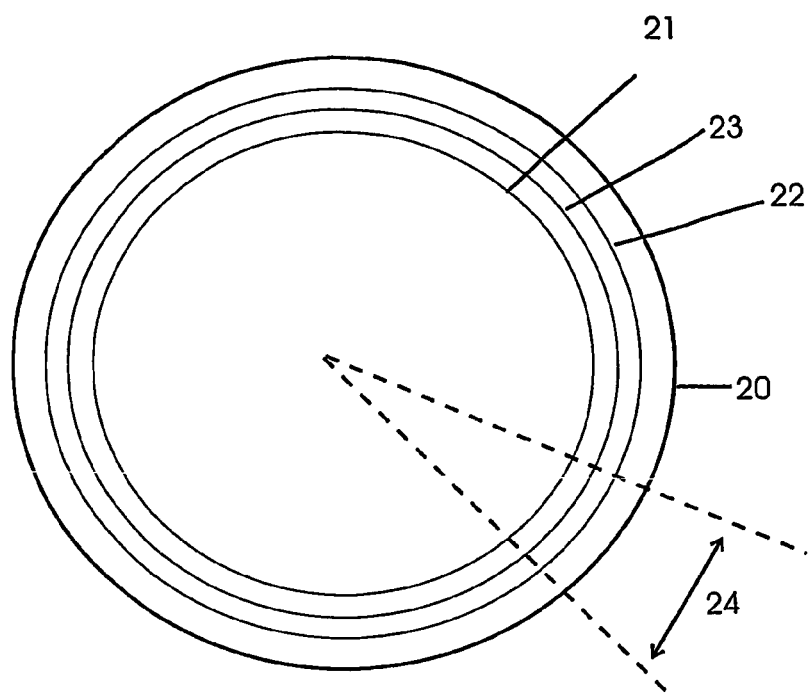
FIG. 2 shows a record carrier in the shape of a disc comprising concentric tracks

FIG. 2 shows a record carrier with concentric tracks.

Because of the concentric tracks each track holds a slightly different amount of data compared to the adjacent tracks. This would theoretically pose a problem because the tracks that are supposed to be each other's opposite as much as possible hold different amounts of data. Because there are many tracks and the tracks are located very closely together the difference in the amount of data between a first track 21 and a second track 22 is very small.

When observing the tracks locally, for instance in the pie section 24 indicated, the curvature is very small because of the radius of the track and the size of the pits that the tracks can be considered to be straight and to run parallel for that section of the tracks that is relevant for the crosstalk.

It is furthermore not required to obtain exact opposite polarity of the tracks for all positions since information must be stored which results in differences between the tracks anyway. It is consequently no problem to have different amounts of data in the tracks since it is the overall reduction in crosstalk by striving to opposite polarity for as many bit positions as possible that will contribute to a lower Bit Error Rate in the third track 23.

Figure 3:
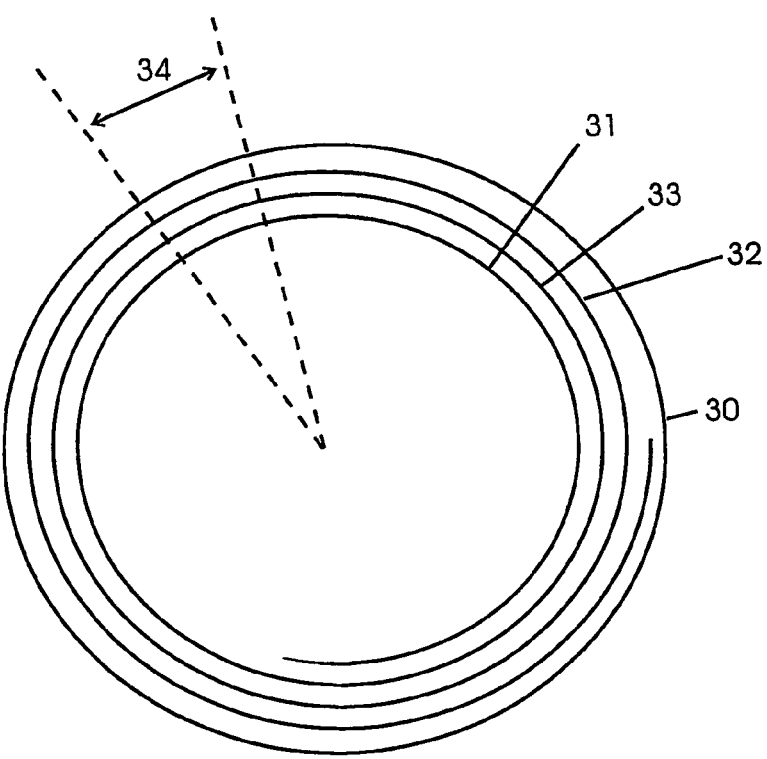
FIG. 3 shows a record carrier in the shape of a disc comprising a spiraling track.

FIG. 3 shows a record carrier with a track spiraling outward. When observing the tracks locally, for instance in the pie section 34 indicated, the curvature is very small because of the radius of the track and the close proximity of the tracks compared to the radius of the tracks. The sections of the tracks that are adjacent to each other can be considered to be sections of adjacent concentric tracks as discussed in FIG. 2 instead of sections of a spiraling track. The discussion of FIG. 2 is thus also valid for the case where there is a single spiraling track, spiraling inward or outward.

Figure 4:
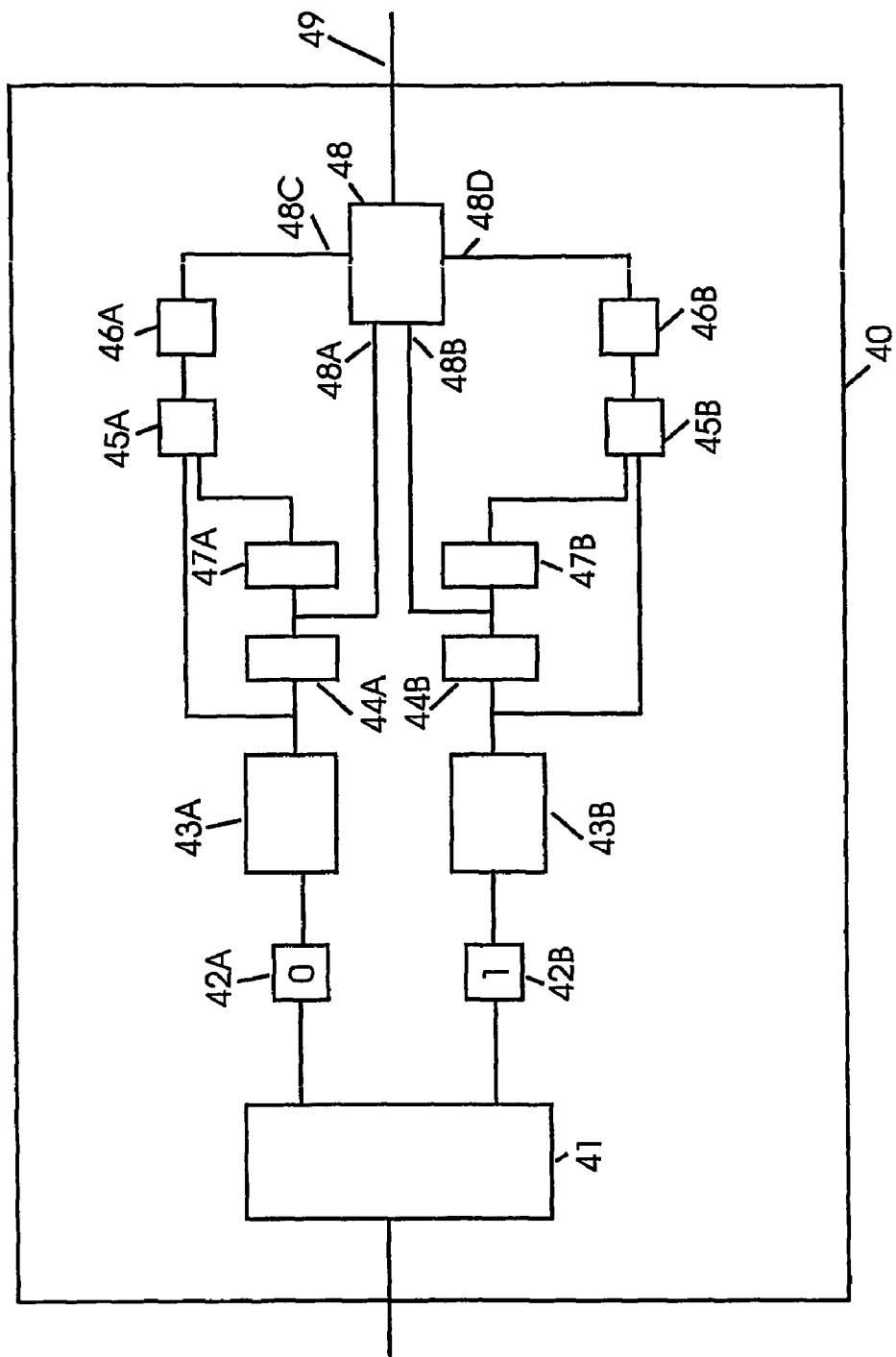
FIG. 4 shows an encoder for encoding the data to be recorded in the tracks

FIG. 4 shows an encoder 40 comprising an coder 41. The data to be recorded on the record carrier is presented to the input of the coder 41, is encoded by the coder 41 and the encoded data is provided at the output of the coder 41. From the output of the coder 41 the encoded data is passed to the input of the first bit insertion means 42A and to the input of the second bit insertion means 42B. The first bit insertion 42A means inserts a '0' bit at predetermined control points in the encoded data stream. The second bit insertion means 42B inserts a '1' bit at predetermined control points in the encoded data stream. The first bit insertion means 42A provides the encoded data stream comprising '0' bits at the predetermined control points to the first NRZI coder 43A which encodes the data and provides the resulting NRZI encoded data based on the data with the '0' bits at the predetermined control points to the first delay means 44AB and an input of the first exclusive NOR means 45A. The second bit insertion means 42B provides the encoded data stream comprising '1' bits at the predetermined control points to the first NRZI coder 43B which encodes the data and provides the resulting NRZI encoded data based on the data with the '1' bits at the predetermined control points to the second delay means 44B and the input of a second exclusive NOR means 45B. The first delay means 44A delays the data coming from the first NRZI coder 43A for the duration of one track and provides the delayed data to the third delay means 47A and to a first input 48A of the selection means 48. The second delay means 44B delays the data coming from the second NRZI coder 43B for the duration of one track. and provides the delayed data to the fourth delay means 47B and to a second input 48B of the selection means 48. The third delay means 47A delays the delayed data coming from the first delay means 44A by the duration of a track and provides the data, which is now delayed by the duration of two tracks compared to the output of the first NRZI coder 43A, to the second input of the first exclusive NOR means 45A.

The fourth delay means 47B delays the delayed data coming from the second delay means 44B by the duration of a track and provides the data, which is now delayed by the duration of two tracks compared to the output of the second NRZI coder 43B, to the second input of the second exclusive NOR means 45A. The output of the first exclusive NOR means 45A is provided to the input of the first integrator means 46A, which integrates the output data provided by first exclusive NOR means and provides the result of this integration to the third input 48C of the selection means 48. The output of the second exclusive NOR means 45B is provided to the input of the second integrator means 46B, which integrates the output data provided by second exclusive NOR means and provides the result of this integration to the fourth input 48D of the selection means 48. The selection means 48 determines whether the content of the first delay means 44A or the content of the second delay means 44B results in a lower crosstalk and provides the content of that delay means to the output of the selection means 48. The selected content is provided by the output of the selection means to the output 49 of the encoder 40.

The determination is done for a section of data that is present in the first delay means 44A and in the second delay means 44B. Once a selection is made the integrator means 46A, 46B are reset to start the determination for the next section of data again.

The exclusive NOR means determine the differences between the current data and the date that is delayed for the duration of 2 tracks. The current data corresponds with the third track 3 in FIG. 1. The data that is delayed for the duration of two tracks corresponds to the second track in FIG. 1.

The exclusive NOR means 45A, 45B thus determines the differences between the second track 2 and the first track 1 in FIG. 1 for each bit position. The third track 3 in FIG. 1 is ignored for the determinations since it is only the victim of the crosstalk, not a contributor.

The integrators 46A, 46B effectively count the number of bit positions which are equal between the content of the delay means 44A, 44B and the delayed data. A high number coming from the integrator indicates many bit positions with equal bit values. A low number coming form the integrator indicates many bit positions with un-equal bit values. Since the determination is performed for both the '0' value and the '1' value of the inserted bit at the predetermined control points the selection means receives two indications, one from the first integrator 46A, indicating the amount of crosstalk in case a '0' is inserted, and one from the second integrator, indicating the amount of crosstalk in case a '1' is inserted. By selecting the data corresponding to the integrator that provides the lowest integrated output value, the lowest crosstalk on the record carrier is achieved.

It is to be noted that although the example uses a parallel determination of the inserted bit at the predetermined control point that yields the lowest cross talk and illustrates this example in hardware, it is equally suitable to implement this principle in a serial fashion, i.e. first determining the crosstalk for an inserted bit value of '0' and then determining the crosstalk for an inserted bit value of '1', then selecting the inserted bit yielding the lowest crosstalk and encoding the data using that inserted bit value for recording on the record carrier. This can of course also be done in software on a processing means instead of in hardware.

It should further be noted that although the invention was illustrated using bit insertion at predetermined control points other methods to affect the way the data is encoded and decoded exist that can just as easily be applied. An example of this is code word replacement where during the encoding some code words, based on a predetermined table, or sequences of code words are replaced by the coder 41 by other code words that can never occur. The code words that can never exist affect the way the data is encoded by the NRZI coders 43A, 43B, for instance by differing an odd number of '1' from the replaced code word, and can thus affect the amount of crosstalk. During decoding the decoder 91, instead of removing inserted bits, replaces the code word that can never exist with the corresponding code word from the predetermined table in order to restore the original data.

Figure 5:
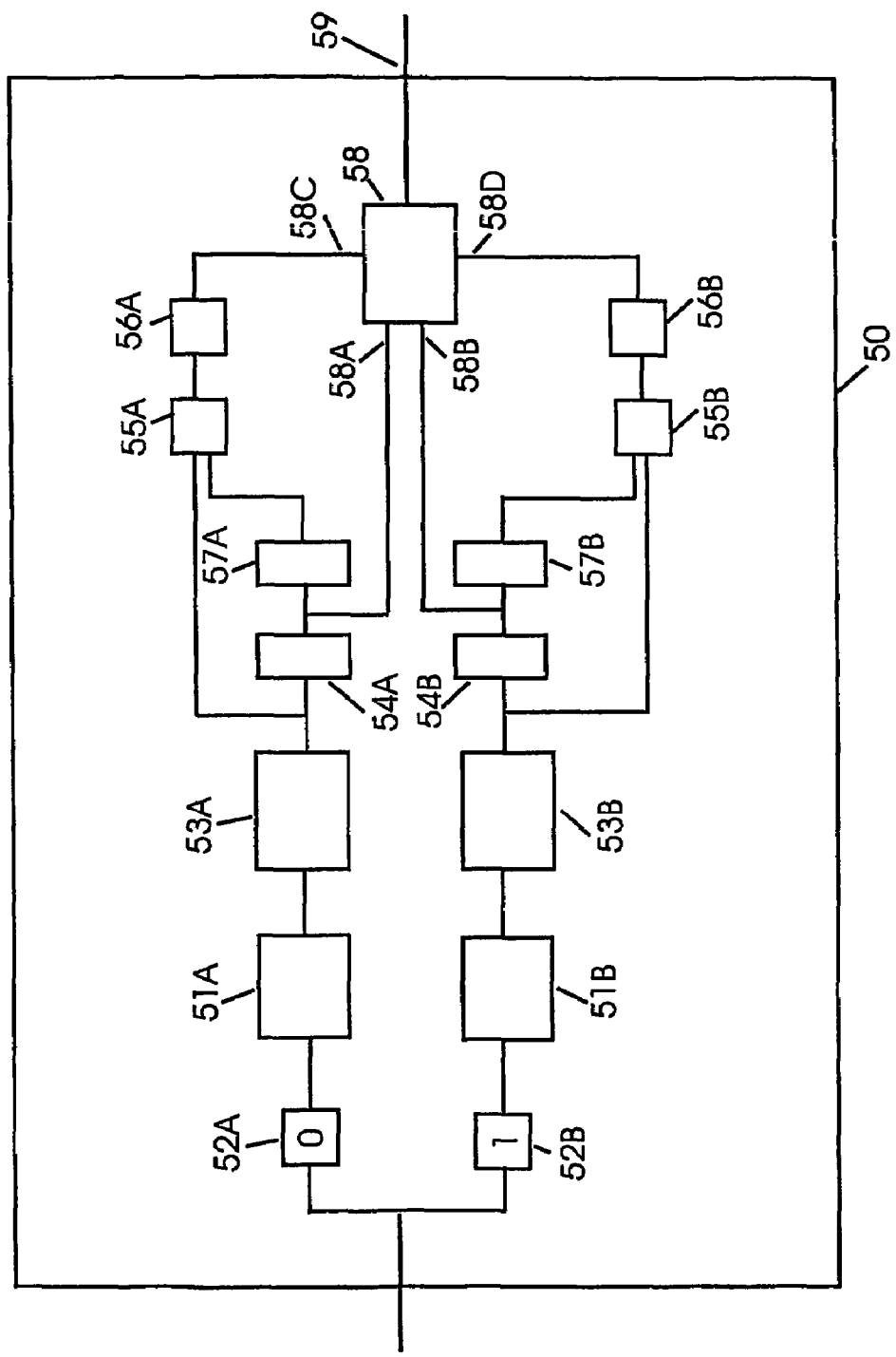
FIG. 5 shows a further encoder for encoding the data to be recorded in the tracks

FIG. 5 shows a similar encoder 50 as the encoder 40 of FIG. 4 but now modified to guarantee that the resulting code words produced by the encoder 50 comply with the channel constraints. The elements 42A, 42B, 43A, 43B, 44A, 44B, 45A, 45B, 46A, 46B, 47A, 47B, 48A, 48B, and 49 in FIG. 4 correspond respectively to the elements 52A, 52B, 53A, 53B, 54A, 54B, 55A, 55B, 56A, 56B, 57A, 57B, 58A, 58B and 59 in FIG. 5. The coder 41 of FIG. 5 is split into two identical coders 51A, 51B because the two versions of the data stream, one with inserted bits with bit value '0' at the control points and one with the inserted bits with bit value '1' at the control points, have to be encoded to determine which bit value of the inserted bit at the control point yields the lowest crosstalk.

To guarantee that the resulting code words comply with the channel constraints the bit insertion means 52A, 52B are moved to a position before the first coders 51A, 51B instead of between the first coder 41 and second 43A, 43B coders of FIG. 4. When inserting a bit into the encoded data stream, as shown in FIG. 4 where the bits are inserted after the first coder 41, the channel constraint can be violated. When the bits are inserted at predetermined control points in the data stream before the coders 51A, 51B where the data stream is not yet encoded the inserted bits are included in the encoding. All code words produced by the coders 51A, 51B comply with the channel constraints. The code words of the encoder 50 as shown in FIG. 5 therefore also comply with the channel constraints.

Figure 6:
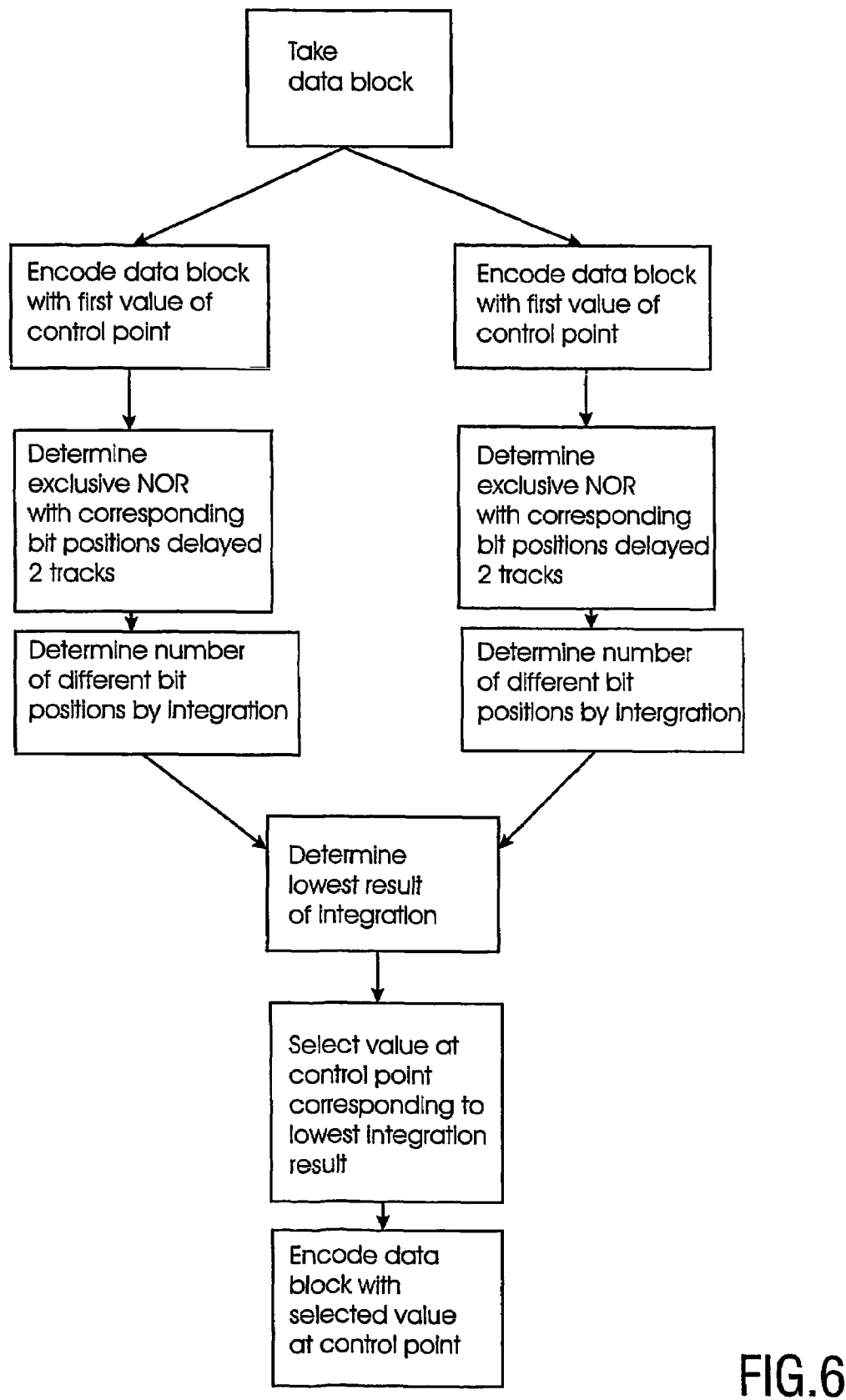
FIG. 6 shows a flow chart of a software implementation of the crosstalk reduction.

FIG. 6 shows the steps of a software implementation of the invention. A block of data is taken from the input stream. The block of data is located between two control points.

Next, two operations are to be performed, either serially or in parallel. First a value is chosen for the control point and the data block from that control point until the next control point is encoded. The resulting bits are compared to the bits at corresponding positions in the track before the previous track. This is achieved by performing a bit wise exclusive NOR operation on the encoded bits and bits located in corresponding positions in the track before the previous track, i.e. bits that are delayed by two tracks.

The exclusive NOR operation results in a '1' for each position where the encoded bit and the bit located in the corresponding position in the track before the previous track have the same bit value, i.e. both have the bit value '0' or both have the bit value '1'. An integrator is used to count the number of '1's resulting from the exclusive NOR operation. By counting the number of '1's an indication of the cross talk is obtained. A high number of '1's means that a high level of crosstalk will present.

A low number of '1's means that a low level of crosstalk and consequently low contribution to the noise level of the data located on the track between the two tracks being processed.

Then a second value is chosen for the control point and the data block from the control point until the next control point is again encoded but now with a different control value. The resulting bits are compared to the bits at corresponding positions in the track before the previous track. This is achieved by performing a bit wise exclusive NOR operation on the encoded bits and the corresponding bits located in the track before the previous track, i.e. bits that are delayed by two tracks.

The exclusive NOR operation results in a '1' for each position where the encoded bit and the bit located in the corresponding position in the track before the previous track have the same bit value, i.e. both have the bit value '0' or both have the bit value '1'.

An integrator is used to count the number of '1's resulting from the exclusive NOR operation. By counting the number of '1's an indication of the cross talk is obtained. A high number of '1's means that a high level of crosstalk will present.

A low number of '1's means that a low level of crosstalk and consequently low contribution to the noise level of the data located on the track between the two tracks being processed.

The results of the two integrators are compared and the value for the control point resulting in an encoding resulting in the lowest of the two results is then chosen.

The value is assigned to the control point and the encoding is now repeated to yield the final data to be recorded on the record carrier.

It is to be noted that this last encoding step can be avoided by using a buffers in which both versions of the encoded data block are stored and after comparison of the results of the integrators the version of the encoded data block corresponding to the lowest result of the integrator is read from the buffer instead of being recalculated.

Figure 7:
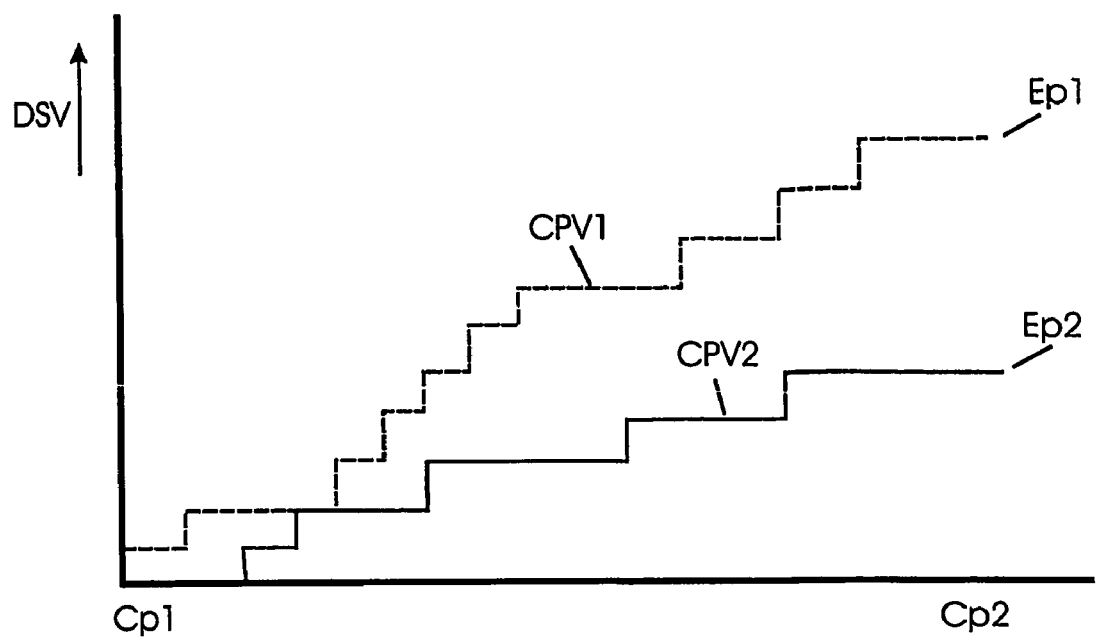
FIG. 7 shows a graph of the digital sum value indicating the level of crosstalk

FIG. 7 shows the digital sum value as calculated, by integrating the output of the exclusive NOR, for a data block between a first control point CP1 and a second control point CP2. The digital sum value can only increase since it is the integration of the number of corresponding bit positions with equal bit values. Shown are two curves, a first curve corresponding to the data block being encoded with a first control point value CPV1, the second curve corresponding to the same data block being encoded with a second control point value CPV2.

The first end point value EP1 is the final value of the integration at the end of the data block when the first control point value CPV1 is used when encoding. The second end point value EP2 is the final value of the integration at the end of the data block when the second control point value CPV2 is used when encoding.

Figure 8:
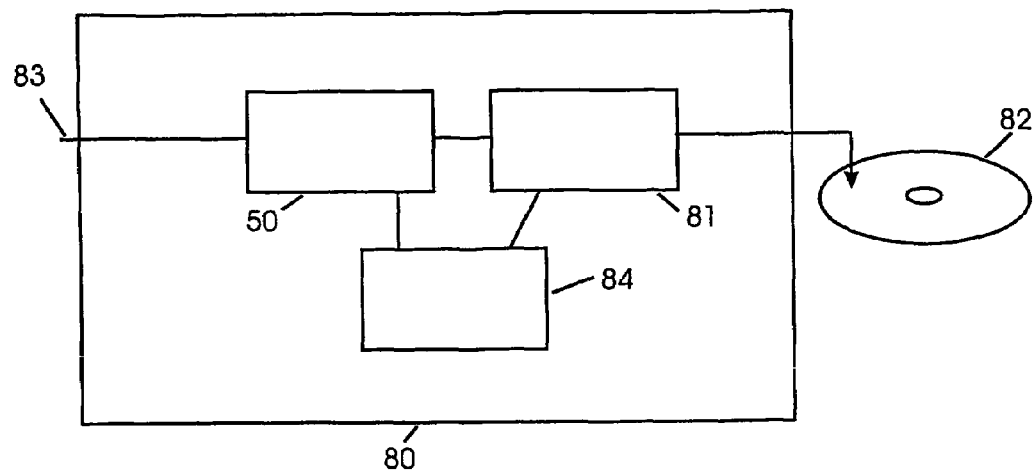
FIG. 8 shows a recording device comprising the invention.

The lowest of the two end point values EP1, EP2 is chosen to be used at the control point CP1 at the beginning of the data block. This results in the encoded data block causing the lowest crosstalk in the neighboring track as explained above FIG. 8 shows a recording device comprising the invention.

The recording device 80 comprises an encoder 50, receiving data to be stored on the record carrier from an input 83. The encoder 50 comprises the functionality of the encoder 50 of FIG. 5. The encoded data is then passed on to the bit engine 81 which processes the data and records the data on the record carrier 82 in the regular fashion. Both the bit engine 81 and the encoder 50 are controlled by the controlling means 84, for instance a microcontroller, again in the regular fashion of a recording device.

Figure 9:
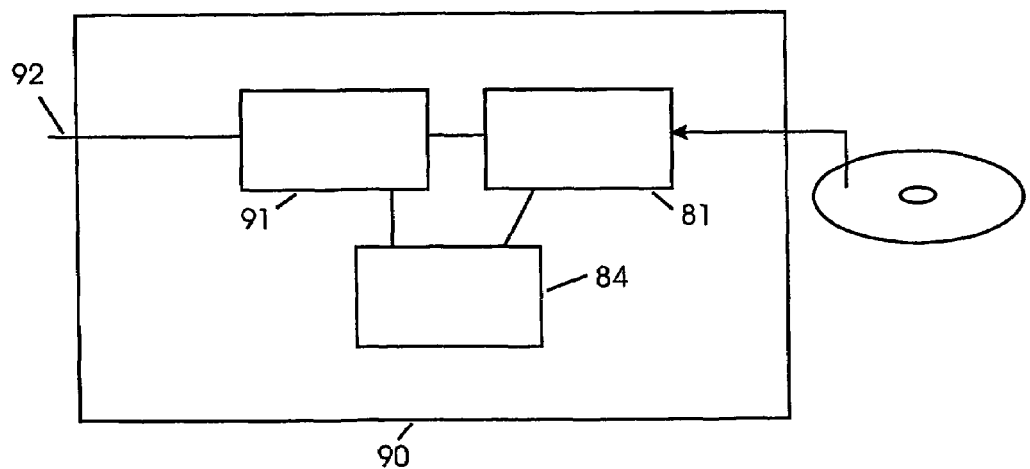
FIG. 9 shows a playback device.

FIG. 9 shows a playback device.

The playback device 90 comprises a bit engine 81 for retrieving the recorded data from the record carrier, processing it, and providing it to the decoder 91. The decoder reverses the encoding in the regular fashion and removes the inserted bits at the predetermined control points. The original data is thus restored and the decoder 91 can provide the decoded data where the inserted bit are removed to the output 92 of the playback device 90.

It should again be noted that although the invention was illustrated using bit insertion at predetermined control points other methods to affect the way the data is encoded and decoded exist that can just as easily be applied. An example of this is code word replacement where during the encoding some code words, based on a predetermined table, are replaced by code words or sequences of code words that can never exist by the coder 41. The code words that can never exist affect the way the data is encoded by the NRZI coders, for instance by differing an odd number of '1' from the replaced code word, and can thus affect the amount of crosstalk. During decoding the decoder 91, instead of removing inserted bits, replaces the code word that can never exist with the corresponding code word from the predetermined table in order to restore the original data.

The invention claimed is:

1. A method for encoding a stream of input words into a stream of code words using a channel code for storage of the stream of code words on a recording medium comprising tracks for storage of the stream code words, said method comprising the step of:

coding the stream of input words into the stream of code words, characterized in that the method further comprises the steps of:

determining a control point in the data stream of input words or the stream of code words where the data stream of input words or the stream of code words can be altered by an alteration;

for each alteration of a group of N possible alterations, determining, between a group of code words in a first track and a group of code words in a second track which is adjacent to a third track which is adjacent to the first track, a crosstalk value representing the cross talk affecting the third track corresponding to the alteration;

selecting an optimum alteration, where the optimum alteration is that alteration from the group of N alterations which has a lowest cross talk value; and altering the data stream using the optimum alteration.

2. The method for encoding a stream of input words into a stream of code words using a channel code as claimed in claim 1, characterized in that N=2.

3. The method for encoding a stream of input words into a stream of code words using a channel code as claimed in claim 2, characterized in that the control point is a bit insertion point.

4. The method for encoding a stream of input words into a stream of code words using a channel code as claimed in claim 1, characterized in that the control point is a code word replacement point.

5. The method for encoding a stream of input words into a stream of code words using a channel code as claimed in claim 1, characterized in that the control point is determined in the stream of input words.

6. The method for encoding a stream of input words into a stream of code words using a channel code as claimed in claim 1, characterized in that control point is determined in the stream of code words.

7. The method for encoding a stream of input words into a stream of code words using a channel code as claimed in claim 1, characterized in that a crosstalk value is determined calculating a digital sum value of an exclusive NOR operation performed bitwise on the group of code words in the first track and the group of code words in the second track.

8. The method for encoding a stream of input words into a stream of code words using a channel code as claimed in claim 1, characterized in that the group of code words in the first track is limited to a section of the first track and that the group of code words in the second track is limited to a section of the second track and that the section of the first track is aligned perpendicular to a reading direction of the first track with the section of the second track.

9. The method for encoding a stream of input words into a stream of code words using a channel code as claimed in claim 8, characterized in that the bitwise exclusive NOR function includes a weighing function reflecting a physical distance.

10. An encoder for encoding a stream of input words into a stream of code words using a channel code for a recording medium comprising tracks for storage of the stream of code words, said encoder comprising coding means for encoding the stream of input words into a stream of code words, characterized in that the encoder further comprises:

control point alteration means having an input for receiving a data stream and an output connected to the encoding means where the control point alteration means is operative to determine a control point in the data stream at the input where the data stream can be altered, and to alter the control point in accordance with an alteration instruction received on a alteration instruction input;

crosstalk determination means having an input connected to an output of the encoding means and an output, said crosstalk determination means being operative to determine a first crosstalk value for a first control point alteration and a second crosstalk value for a second control point alteration; and selection means having an input connected to the output of the crosstalk determination means and an output connected to the alteration instruction input of the control point alteration means, said selection means being operative to select a control point alteration corresponding to the lowest crosstalk value of the first crosstalk value and the second crosstalk value.

11. The encoder as claimed in claim 10, characterized in that the crosstalk determination means is operative to process a group of code words in a first track of the recording medium and a group of code words in a second track of the recording medium which is adjacent to a third track of the recording medium which is adjacent to the first track of the recording mediums when determining a crosstalk value representing the cross talk affecting the third track.

12. A recording device comprising the encoder as claimed in claim 10.

13. A recording medium comprising tracks comprising a stream of code words, characterized in that the stream of code words comprises a first data block in a first track and a control point, corresponding to the first data block, added to the stream of code words and inserted in the track, the control point having a value, where the value is based on a cross talk between the first data block in the first track and a second data block in a second track, where the second track is adjacent to a third track which is adjacent to the first track.

* * * * *